(12) United States Patent
Nieberding

(10) Patent No.: US 6,394,064 B1
(45) Date of Patent: May 28, 2002

(54) METHOD FOR OPERATING A FOUR-STROKE INTERNAL COMBUSTION ENGINE

(75) Inventor: Rolf-Guenther Nieberding, Stuttgart (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/601,743
(22) PCT Filed: Jan. 16, 1999
(86) PCT No.: PCT/EP99/00226
§ 371 (c)(1), (2), (4) Date: Aug. 7, 2000
(87) PCT Pub. No.: WO99/40301
PCT Pub. Date: Aug. 12, 1999

(30) Foreign Application Priority Data

Feb. 7, 1998 (DE) ......................................... 198 04 983

(51) Int. Cl.[7] ............................................... F02B 17/00
(52) U.S. Cl. ......................... 123/295; 123/299; 701/106
(58) Field of Search ................. 123/295, 299, 123/300, 430; 701/103, 104, 105, 106

(56) References Cited

U.S. PATENT DOCUMENTS

| | | | | |
|---|---|---|---|---|
| 4,612,898 A | * | 9/1986 | Steiger et al. | 123/299 |
| 4,872,433 A | * | 10/1989 | Paul et al. | 123/299 |
| 4,924,828 A | * | 5/1990 | Oppenheim | 123/299 |
| 5,060,610 A | * | 10/1991 | Paro | 123/300 |
| 5,609,131 A | * | 3/1997 | Gray, Jr. et al. | 123/299 |
| 5,947,080 A | * | 9/1999 | Weissman et al. | 123/300 |

FOREIGN PATENT DOCUMENTS

| | | | | |
|---|---|---|---|---|
| DE | 464601 C | * | 8/1930 | |
| DE | 1122763 B | * | 1/1962 | |
| DE | 2017153 A | * | 10/1971 | |
| DE | 195163 A | * | 5/1996 | |

* cited by examiner

*Primary Examiner*—Willis R. Wolfe
(74) *Attorney, Agent, or Firm*—Crowell & Moring LLP

(57) ABSTRACT

In a method for operating a four-stroke internal combustion engine, a homogeneous lean basic mixture of air and fuel is ignited by compression ignition. The fuel is introduced by direct fuel injection into a combustion space delimited by a cylinder with a piston guided sealingly therein.

Figure 1:
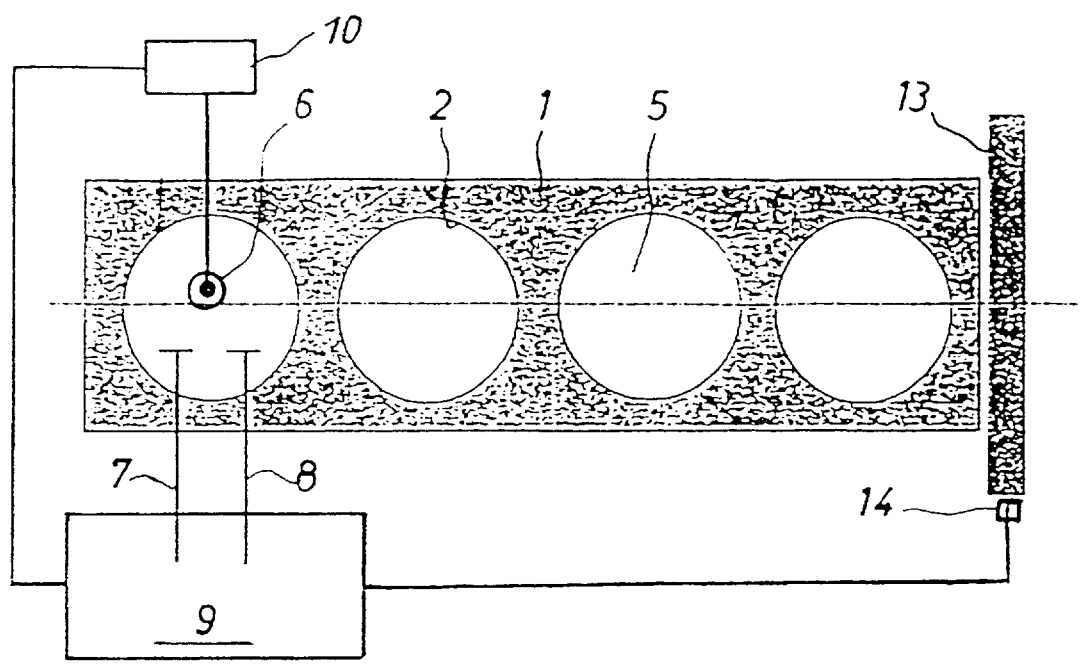

In the case of homogeneous mixture formation, due to the supply of energy as a result of compression a homogeneous ignition performance is established, and pronounced self-accelerating energy release takes place as a result.

15 Claims, 1 Drawing Sheet

METHOD FOR OPERATING A FOUR-STROKE INTERNAL COMBUSTION ENGINE

The invention relates to a method for operating a four-stroke internal combustion engine of the generic type specified in the pre-characterizing clause of Claim 1.

Internal combustion engines, in the compression ignition of homogeneous lean air/fuel mixtures, afford the possibility of low nitrogen oxide formation and high thermal efficiency. However, these advantages arise only within a narrow operating range which depends on a multiplicity of rapidly changing boundary conditions.

In compression ignition, the air/fuel mixture is brought to ignition by means of compression heat. After the start of ignition, a self-accelerating combustion process is initiated by the energy released at the same time. Compression which is too low leads to delayed incomplete combustion, and compression which is too high leads to inadmissibly steep pressure rises and to gas oscillations in the working space (knocking combustion).

DE-195 19 663 A1 describes a method for operating an internal combustion engine with compression ignition. Here, in a first step, a homogeneous and lean air/fuel mixture produced by external mixture formation is compressed nearly to the ignition limit. In a second step, an additional quantity of the same fuel is finely atomized and, avoiding contact with the wall, is injected into the working space. The fuel injected late forms a mixture cloud which ignites, since, because of the higher fuel content, its ignition limit is below the compression temperature reached in the first step.

The object on which the invention is based is to provide a method of the generic type specified in the pre-characterizing clause of Claim 1, by means of which low-consumption and low-pollutant combustion adapted to the respective operating range is possible.

The object is achieved by means of a method having the features of Claim 1.

The timing and profile of combustion are critical for low-consumption and low-pollutant operation free of misfires and knocking. A start of combustion in the region of top dead centre is optimal in terms of consumption and pollutants. By contrast, delayed combustion causes fuel consumption and pollutant emission to rise and leads to combustion misfires, whereas premature combustion leads to inadmissible pressure rises and peak pressures with knocking phenomena.

In an internal combustion engine, the temperature of the mixture is increased as a result of the geometric compression of the closed-off maximum initial volume to a remaining residual volume. A temperature which over time brings the mixture to the ignition threshold is established in the compressed volume. The combustion process which follows the compression ignition of the mixture is a process which is self-accelerating on account of the energy released as a result of combustion. During the combustion process, the reaction continues to accelerate. The high reaction rate of combustion leads to sharp pressure rises in the combustion space which constitute an undesirable form of combustion. The fuel quantity ready for ignition in the combustion space has an effect on the pressure profile, that is to say the greater this fuel quantity is, the sharper the rise in reactivity and the steepness of the pressure rise become. The limits of combustion in the case of the compression ignition of homogeneous lean mixtures towards a higher load, with consequently greater fuel quantities in the combustion space, is attributable to the fact that the temperature distribution in the air/fuel mixture in the combustion space is too homogeneous. The problem does not arise with small fuel quantities in the combustion space, since the released energy quantity is not so great that the continuous self-acceleration of the combustion process could lead to an undesirably steep pressure rise in the combustion space.

In the case of a homogeneous mixture distribution and compression, a large quantity of air/fuel mixture is brought near to ignition simultaneously, and many mixture fractions reach the auto-ignition condition at the same time. Inherent in the principle of self-acceleration is the activation of reactivity by means of a differential energy quantity, leading to the release of a multiple of the differential energy quantity released.

The delay in the ignitions of the mixture may delay the release of energy, so that limited pressure rises which are in an acceptable range occur in the combustion space. An ignition delay takes place as the result of an absorption of the combustion energy released. Since the ignition operation is an integral process in energy terms, a delay in energy release can be achieved by means of a time-related and local spreading of the auto-ignition operation. Instead of ignition being based on the homogeneity of the mixture with a similar tendency to ignition, it is now based on a gradient of the ignition performance of the mixture, thus leading to a time-delayed energy reaction in the combustion space, the pressure rises being lower because of delayed combustion. The gradient of the ignition performance in the mixture is found differentially in all the mixture fractions which are involved in the injection. The gradient should not be so great that the temperature gradient established in the mixture is such that the energy transmission of the combustion reaction is determined by heat conduction.

A time-related and local spreading of the ignition performance can be set by means of a different energy absorption over time and space. Energy is absorbed due to the evaporation and intermixing energy of the fuel in the air and to the specific heat capacity of the mixture during the auto-ignition phase. With the aid of internal mixture formation in the reciprocating-piston engine, it is possible to produce a local gradient of the ignition performance via the mixture volume. The fuel quantity is introduced into the medium present in the combustion space, in such a way that combustion-space regions with different fuel evaporation are obtained. In the regions with earliest and best evaporation, the fuel fractions receive the highest energy supply over time and, by virtue of this, form the greatest tendency to ignition. The regions where intermixing is still incomplete still absorb energy during evaporation, that is to say delay the tendency to auto-ignition. Energy absorption due to evaporation gives rise to the gradient of the ignition performance over the combustion space. For the loading increase during combustion with compression ignition, gradient formation is possible by the injection operation being stratified into a plurality of injection operations. Time-stratified injection consists, during compression, of already highly ignitable fuel regions. Thee fuel fractions freshly supplied to the combustion space absorb energy from the compressed mixture during their treatment phase and delay the ignition process of the already precompressed mixture. The energy absorption reduces the pressure rises.

For designing a reciprocating-piston engine with variable effective compression, for example by the free activation of the inlet and outlet members via the uniform variation in the combustion-space volume, mixture formation can be combined with the retention of exhaust gases in the combustion space in order to influence the next combustion operation. For exhaust-gas retention, in the case of a reduction in the combustion-space volume the outlet member is closed earlier, with the result that the exhaust-gas quantity is compressed and subsequently expanded over the minimum volume. In the case of early opening directly after the time of the minimum volume and of subsequent pressure equalization between the combustion space and surroundings, a uniform stratification of hot exhaust gas in relation to the cold fresh gas is established in the combustion space. During late opening of the inlet members, because of the greater pressure difference a higher inflow energy is provided which reduces the stratification of exhaust gas and fresh gas.

In two-layer combustion-space temperature distribution, the fuel can be injected early for low loads and the consequently small fuel quantity. The small fuel quantities are distributed in the fresh gas effectively and uniformly. The compact charge of exhaust gas, because of its low surface/volume ratio, acquires a high temperature which leads to the easy ignition of the fresh mixture with a high air excess. The high air excess prevents the acceleration of the reaction towards steep pressure rises. The introduction of the fuel into the fresh-charge region counteracts the unintended processes of fuel reaction, such as, for example, high-temperature combustion, which leads to the formation of NOx, or dehydration and coagulation, which yield soot. For higher loads, the opening of the inlet valve is delayed, thus leading to better intermixing of the hot exhaust gas and of the colder fresh air. For a homogeneous temperature distribution in the combustion space, late injection or the separation of the injection operation in the way illustrated above can give rise to a gradient in the ignition performance. Early injection during the turbulent mixture formation of the fresh gas with the exhaust-gas fractions in the combustion space as a result of the late opening of the inlet valve allows the fuel fraction injected earlier to be distributed homogeneously in the combustion space and to ignite as a result of a temperature increase over the treatment time. The second fuel fraction is supplied later, in order to bring about a local lowering of the ignition performance as a result of the absorption of energy due to evaporation.

One limit value is determined by the optimally uniform mixture treatment as a result of very early injection. The opposite limit value is formed by the introduction of the mixture in the combustion space so late that the evaporation of the fuel can no longer take place before the reaction of sufficiently large fractions of the treated fuel. The high energy states in the surroundings of the incompletely treated and unburnt fuel lead to dehydration operations and coagulations in rich ranges, up to the formation of soot in the combustion space and in the exhaust-gas tract. The method according to the invention is carried out exclusively between these two limits mentioned.

Solid-borne sound, ionic current and rotational non-uniformity are measurement quantities which, simultaneously with combustion, reproduce the position and profile of the latter and thereby afford the precondition for rapid control action. This control action is made possible, using stored characteristic maps or employing high-speed adaptive electronics on the principle of neural networks. In addition to the data which monitor combustion, these electronics also take into account the valve control times and the injection times and also the air excess values derived from them.

Figure 2:
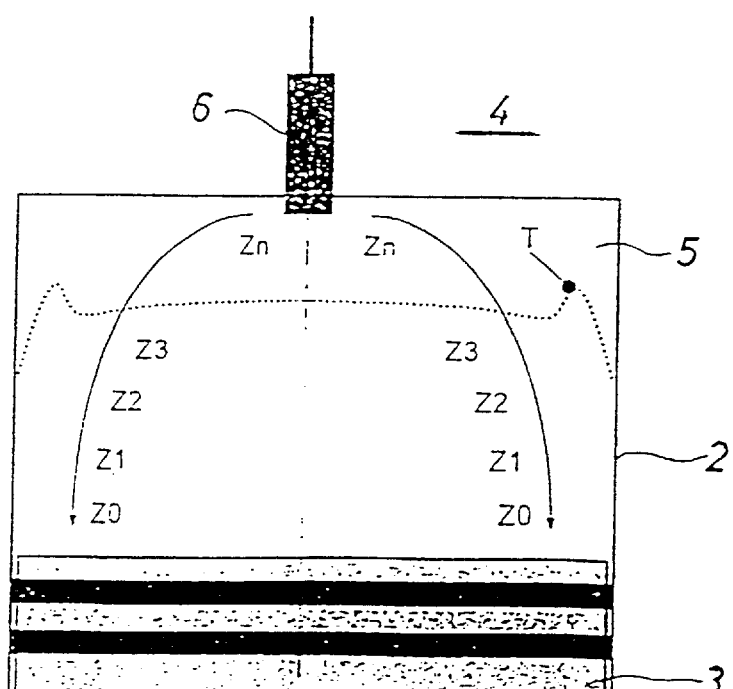

An exemplary embodiment of the invention is explained in more detail below with reference to the drawing in which:

FIG. 1 shows a diagrammatic illustration of an internal combustion engine with a control unit for the gas exchange members and the fuel injection valves, FIG. 2 shows a section through a working space with a fuel injection valve and regions of different ignition performance in the case of direct fuel injection into the late compression stroke.

The internal combustion engine illustrated diagrammatically in FIGS. 1 and 2 possesses a cylinder block 1 with four cylinders 2, in which pistons 3 are guided sealingly and which are closed by means of a cylinder head 4. The cylinder 1, piston 3 and cylinder head 4 surround a combustion space 5 in which combustion takes place.

Located in the cylinder head 4, for each combustion space 5, are a fuel injection valve 6, an inlet valve 7 and an outlet valve 8. The gas exchange valves 7, 8 are opened and closed by a valve control unit 9. The fuel injection valve 6 is actuated in terms of injection timing and fuel quantity by an injection control 10 which is connected to the valve control unit 9 for the coordinated control of the gas exchange valves 7, 8.

Located on the crankshaft end projecting from the cylinder block 1 is a flywheel 13, in the region of which is provided a rotational-speed sensor 14 for measuring the rotational non-uniformity of the crankshaft. The rotational-speed sensor 14 and other suitable sensors supply real-time signals relating to the position and profile of combustion so that the control of the fuel injection valve 6 and of the gas exchange valves 7, 8 can be carried out on the basis of these values.

FIG. 2 illustrates a section through the combustion space 5 which is delimited by the cylinder 2, piston 3 and cylinder head 4 and into which the fuel injection valve 6 injects fuel. The points designated by $Z_0$ to $Z_n$ represent diagrammatically the fuel fractions which, with an increasing subscript, have entered the combustion space later and therefore have a lower ignition performance. The elements with high subscripts, during their evaporation phase, absorb energy from the mixture regions with an otherwise homogeneous temperature distribution which consist of fuel fractions with low subscripts. The temperature conditions during the compression phase in the combustion space 5 are shown by a temperature profile, designated by T, passing through the said combustion space.

The method according to the invention functions as follows: either air or a lean basic fuel/air mixture enters the combustion space 5 through an inlet member 7. There, the mixture is intermixed with hot exhaust gas and/or is compressed to the auto-ignition limit. After combustion has started, it continues in a self-accelerating manner due to the heat released, especially since many mixture fractions reach the auto-ignition conditions at the same time. In the case of small fuel quantities in the combustion space 5, the released energy quantity is no so great that it may lead to a marked pressure rise in the combustion space. This changes, however, with a rising fuel content in the combustion space 5. If the ignitable mixture quantity were large, as in the case of a homogeneous fuel distribution, this would lead to unintended combustion with steep pressure rises, high peak pressures and pronounced pressure oscillations in the combustion space 5.

This problem, which is critical for the compression ignition of homogeneous mixtures, is eliminated by the present invention, this taking place, on the one hand, due to the regulation of compression in the combustion space 5 and, on the other hand, due to the regulation of fuel distribution in the mixture. These measures may be carried out individually or else in combination.

The different fuel distribution is achieved by means of late direct injection into the homogeneous basic mixture. As a result of the evaporation and mixture-formation heat of the individual fuel droplets, the mixture temperature is reduced locally and its local ignition performance is also thereby reduced. This leads to a reduced pressure rise on account of the delayed release of the entire fuel energy.

For a load increase in the case of combustion with compression ignition, it is advantageous to form a gradient of the ignition performance by the stratification of the injection operation into a plurality of injection operations. During compression, time-stratified injection consists of already highly ignitable fuel regions and of those which are just entering the combustion space. The freshly supplied fuel fractions, during their treatment phase, absorb energy from the precompressed mixture and delay the ignition process of the latter, thus resulting in reduced pressure rises.

In the case of exhaust-gas retention, the outlet valve 8 is closed earlier, with the result that the residual gas is compressed and subsequently expanded at gas exchange dead centre. In the case of an early opening of the inlet valve 7 shortly after gas exchange dead centre and the subsequent pressure equalization between the combustion space 5 and surroundings, a uniform stratification of hot exhaust gas and cold fresh gas is formed in the combustion space 5. In the case of a later opening of the inlet valves 7, a lower stratification of exhaust gas and fresh gas is established because of the higher vacuum and the higher inflow energy caused thereby.

In the case of two-layer temperature distribution in the combustion space 5, the fuel quantity, which is small at low loads, can be injected early. On account of the long mixture formation times, the small fuel quantities are distributed uniformly in the fresh gas. The stratified exhaust gas, because of its low surface/volume ratio, acquires its high temperature which leads to the reliable ignition of the lean mixture. The high air excess prevents acceleration of the reaction, along with the following steep pressure rise. The introduction of the fuel into the fresh charge prevents the consequences of high-temperature combustion with the formation of NOx and of soot.

For higher loads, the opening of the inlet valve 7 is delayed, specifically in order to increase the difference from the surrounding conditions, thus leading to an intermixing of hot exhaust gas and of cold fresh air because of the more pronounced turbulence. In the case of a uniform temperature distribution in the combustion space 5, late fuel injection, which, if appropriate, is sequential, can give a graded ignition performance. The fuel injected early is distributed uniformly on account of the high turbulence of the air/residual-gas mixture and is ignited on account of the long reaction time in the latter. The fuel injected late leads to a local lowering of the ignition performance as a result of the cooling of the mixture due to its evaporation.

By the mixture formation in the combustion space being staggered in time, the homogeneity of the ignition performance in the combustion space can be reduced in such a way that a self-accelerating process continues to be established, but the self-acceleration of this process is lower, thus leading to lower pressure rises.

What is claimed is:

1. A method for operating an internal combustion engine with compression ignition in combustion spaces defined by cylinders and pistons which reciprocate therein, and with direct fuel injection, said method comprising:

at a start of a compression stroke, providing a premixed lean fuel/air charge in a combustion space;

compressing the charge to an auto-ignition limit;

injecting a fuel quantity into the combustion space during the compression stroke, in a plurality of time sequential injection operations, forming a corresponding plurality of locally distributed mixture regions having varied combustion characteristics, such that ignition performance is reduced in mixture regions associated with later injections; and wherein different combustion regions and their characterization are determined from parameters stored in characteristic maps or by the use of neural networks.

2. The method according to claim 1, wherein combustion is regulated as a function of the combustion regions detected, combustion being optimized by organization of injection and mixture formation.

3. A method for operating an internal combustion engine with compression ignition in combustion spaces defined by cylinders and pistons which reciprocate therein, and with direct fuel injection, said method comprising:

at a start of a compression stroke, providing a premixed lean fuel/air charge in a combustion space;

injecting a fuel quantity into the combustion space during the compression stroke, in a plurality of time sequential injection operations, forming in the fuel/air charge a corresponding plurality of locally distributed mixture regions having varied combustion characteristics, such that ignition performance is reduced in mixture regions associated with later injections; and compressing the fuel/air charge with the mixture regions to auto-ignition limit.

4. The method according to claim 3, wherein varying ignition performances in the combustion space form a gradient of the ignition performance during the compression stroke.

5. The method according to claim 3, wherein the gradient of the ignition performance is controlled by injection timing of the fuel in the case of internal mixture formation, ignition performance in the combustion space being determined by temperature and the pressure profiles of the lean mixture over time.

6. The method according to claim 3, wherein combustion is optimized by the variation of compression, turbulence and injection.

7. The method according to claim 3, wherein combustion is optimized by varying compression and controlling inhomogeneity of the air/fuel mixture.

8. The method according to claim 7, wherein the local air/fuel mixture is at most stoichiometric.

9. The method according to claim 3, wherein engine load is varied by simultaneous setting of the injection timing and quantity and by closing of gas outlet and inlet units for the combustion space.

10. The method of claim 9, wherein the step of closing of gas outlet and inlet units for the combustion space includes varying the opening and closing of the gas outlet and inlet units for the combustion space.

11. A method for operating an internal combustion engine with compression ignition in combustion spaces defined by cylinders and pistons which reciprocate therein, and with direct fuel injection, said method comprising:

providing a lean fuel/air mixture in a combustion space during a compression stroke;

after the fuel/air mixture has been compressed, injecting a fuel quantity into the combustion space during the compression stroke, in a plurality of time sequential injection operations, forming in the fuel/air mixture a corresponding plurality of locally distributed mixture regions and absorbing energy from the compressed fuel/air mixture to delay the ignition of the compressed fuel/air mixture in the mixture regions; and compressing the fuel/air mixture with the mixture regions to auto-ignition limit.

12. The method according to claim 11, wherein engine load is varied by simultaneous setting of injection timing and quantity and by opening and closing of gas outlet and inlet units for the combustion space.

13. The method according to claim 11, wherein combustion is optimized by varying compression, turbulence and injection.

14. The method according to claim 11, wherein the mixture regions and their characterization are determined from parameters stored in characteristic maps or by the use of neural networks.

15. The method according to claim 14, wherein combustion is optimized by varying compression and controlling inhomogeneity of the air/fuel mixture.

* * * * *